Dec. 9, 1941.  E. O. SCHWEITZER, JR  2,265,781
ELECTRIC MOTOR CONSTRUCTION
Filed June 15, 1940  2 Sheets-Sheet 1
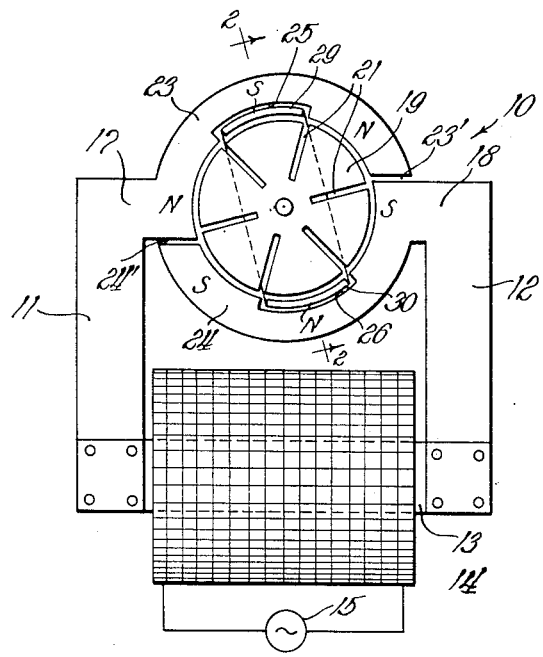
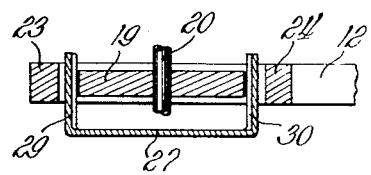
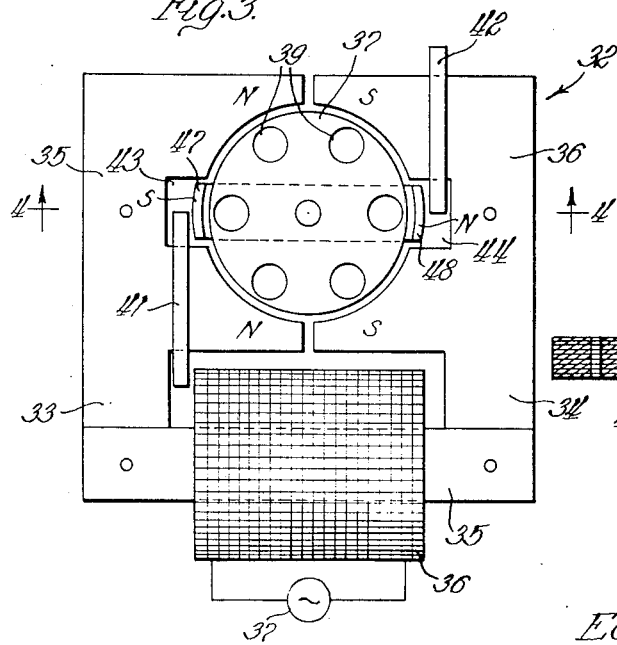
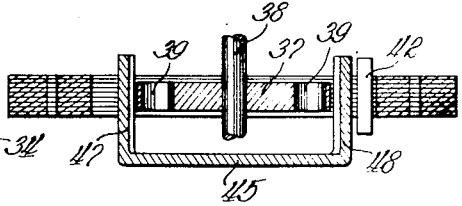
Inventor:
Edmund O. Schweitzer, Jr.
By Brown, Jackson, Boettcher & Dienner
Attys.

Dec. 9, 1941.  E. O. SCHWEITZER, JR  2,265,781
ELECTRIC MOTOR CONSTRUCTION
Filed June 15, 1940   2 Sheets-Sheet 2
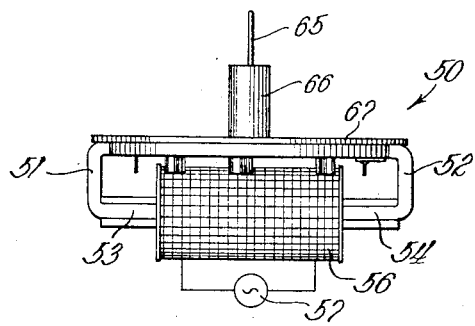
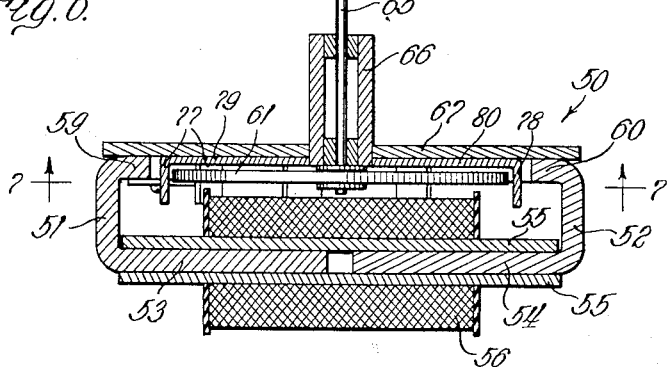
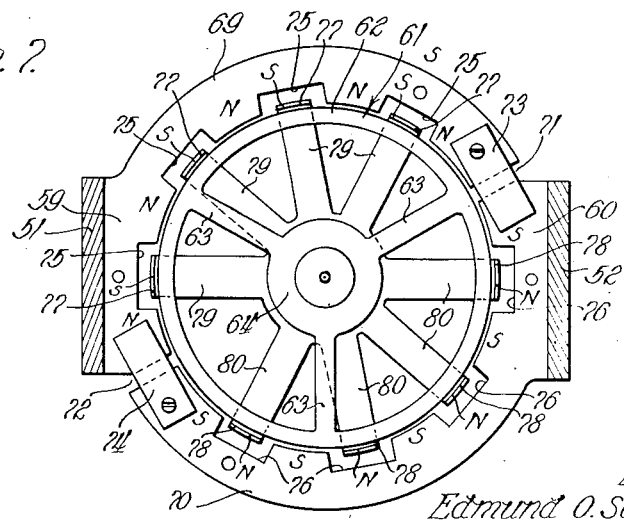
Inventor:
Edmund O. Schweitzer, Jr.

Patented Dec. 9, 1941

2,265,781

UNITED STATES PATENT OFFICE 2,265,781

ELECTRIC MOTOR CONSTRUCTION

Edmund O. Schweitzer, Jr., Northbrook, Ill.

Application June 15, 1940, Serial No. 340,627

14 Claims. (Cl. 172—278)

My invention relates, generally, to electric motors and it has particular relation to small synchronous motors for driving clock mechanisms, time switches, and the like.

An object of my invention is to provide for increasing the number of effective poles of an electric motor over the number otherwise provided by its magnetic circuit.

Another object of my invention is to increase the number of effective poles of a core structure of an electric motor from two to at least six.

Still another object of my invention is to magnetically bridge a pair of pole members on diametrically opposite sides of a rotor in such manner as to increase the number of effective poles from two to at least six.

Other objects of my invention will, in part, be obvious and in part appear hereinafter.

My invention is disclosed in the embodiments thereof shown in the accompanying drawings and it comprises the features of construction, combination of elements, and arrangement of parts which will be set forth in the following description.

For a more complete understanding of the nature and scope of my invention, reference may be had to the following detailed description taken in connection with the accompanying drawings, in which:

Figure 1 is a view in front elevation and somewhat diagrammatic showing one embodiment of my invention;

Figure 2 is a detail sectional view taken along the line 2—2 of Figure 1;

Figure 3 is a view in front elevation and somewhat diagrammatic showing another embodiment of my invention;

Figure 4 is a detail sectional view taken along the line 4—4 of Figure 3;

Figure 5 is a top plan view of still another embodiment of my invention showing a construction in which a large number of effective poles is provided;

Figure 6 is a horizontal sectional view of the pole construction shown in Figure 5; and Figure 7 is a detail sectional view taken along the line 7—7 of Figure 6.

Referring now particularly to Figures 1 and 2 of the drawings, it will be observed that the reference character 10 designates, generally, an electric motor, the construction of which is similar, in certain respects, to the motor construction shown in my Patent 2,187,179. The motor 10 is provided with a magnetic core structure that is provided, in part, by end members 11 and 12 which are joined by a connecting member 13 to provide a generally C-shaped core structure. A winding 14 is provided on the connecting member 13 and is arranged to be energized from a suitable source 15 of alternating current, such as a 60-cycle source. The end members 11 and 12 are provided at their upper ends with pole members 17 and 18 which have generally arcuate faces which are spaced substantially uniformly on diametrically opposite sides of a rotor 19 which is formed of suitable magnetic material.

As shown more clearly in Figure 2 of the drawings, the rotor 19 is mounted on a shaft 20. The shaft 20 is suitably mounted for rotation in bearings (not shown). The rotor 19 may be in the form of a disc and it may be provided with radial slots 21, as shown.

With a view to making the rotor 19 self-starting on energization of the winding 14 from a sinner gle phase alternating current source, each of the pole members 17 and 18 is provided with an arcuate polar extension 23 and 24, respectively. Relatively high reluctance air gaps 23' and 24' are provided between the ends of the polar extensions 23 and 24 and the adjacent pole members 18 and 17. As fully set forth in my patent, hereinbefore referred to, the polar extensions 23 and 24 serve to shift the axis of the magnetic flux between the pole members 17 and 18 during each half cycle of the alternating current so as to produce the effect of a shifting magnetic field and consequently causing the rotor 19 to start from rest.

The motor construction thus far described is essentially the same in all respects as the motor construction shown and described in my above-mentioned patent. As there set forth, the rotor 19 of the present invention will operate at a speed which is determined by the number of poles contained in it. Thus, since the rotor 19 is provided with six polar projections by the slots 21, it tends to rotate at a speed of 1200 R. P. M. when the source 15 operates at a frequency of 60 cycles per second. However, there is a tendency for the rotor 19 to operate at a higher speed than 1200 R. P. M. Unless the polar construction of the rotor 19 is capable of preventing it from running at a speed which is higher than that which is determined by the number of poles and the frequency, it tends to run at a speed which is determined by the number of poles on the stator and the frequency. Since the stator provides two poles, the rotor 19 may, under certain conditions, tend to rotate at a speed of 3600 R. P. M.

With a view to preventing operation of the rotor 19 above the speed of 1200 R. P. M., the polar extensions 23 and 24 are provided with recesses 25 and 26, respectively, which extend angularly a distance substantially equal to the angular distance between adjacent radial slots 21. A magnetic bridging member 27, Figure 2, which is generally U-shaped, has its ends 29 and 30 interfitting in the recesses 25 and 26, respectively. The ends 29 and 30 of the magnetic bridging member 27 are arcuately shaped and generally conform to the shapes of the polar extensions 23 and 24 and the rotor 19. The magnetic bridging member 27 and the ends 29 and 30 are magnetically insulated from the polar extensions 23 and 24 and also from the rotor 19. This is accomplished by providing air gaps therebetween. Suitable means, not shown, are provided for holding the magnetic bridging member 27 in this relationship to the adjacent parts.

Because of the presence of the ends 29 and 30 of the magnetic bridging member 27 within the recesses 25 and 26, magnetic poles are induced in these ends 29 and 30 which are opposite in polarity to that of the inducing poles. For example, at a given instant, the pole member 17 may be a north pole, while the pole member 18 is a south pole. The end 29 of the magnetic bridging member 27 has then induced in it a south pole while the end 30 has induced in it a north pole. North and south poles are likewise induced in the outer ends of the polar extensions 23 and 24. This polar relationship at the instant assumed is indicated by the letters N and S in Figure 1 of the drawings.

It will now be apparent that the magnetic bridging member 27 increases the number of poles otherwise provided by the magnetic core structure of the motor 10 from two to six. With six stator poles in place of two, there is no tendency for the rotor 19 to run at a speed exceeding 1200 R. P. M.

Referring now particularly to Figures 3 and 4 of the drawings, it will be observed that the reference character 32 designates, generally, what is known as a shaded pole type of motor. The motor there shown comprises a magnetic core structure which is formed by end members 33 and 34 connected by a connecting member 35 on which is positioned a winding 36 that is adapted to be connected to a source 37 of alternating current, which, as indicated hereinbefore, may be a 60-cycle source. The end members 33 and 34 are provided with pole members 35 and 36 at their ends which have arcuate pole faces between which a rotor 37 of suitable magnetic material is positioned. The rotor 37 is mounted on a shaft 38, Figure 4, which is mounted in suitable bearings (not shown). The rotor 37 is provided with apertures 39 of which six are shown to provide the rotor 37 with a polar construction having six poles.

In order to make the rotor 37 self-starting, lag loops or shading coils 41 and 42 are provided about the portions of the pole members 35 and 36. The shading coils 41 and 42 are preferably formed of good electric conducting material such as copper, and, as is well known, effect a shifting of the magnetic flux from one part of each pole member 35 and 36 to another part so as to start the rotor 37 from rest.

Now, although the rotor 37 is provided with six effective poles, it operates at a speed of 3,600 R. P. M. when the source 37 operates at a frequency of 60 cycles per second.

In order to reduce this speed, essentially the same means is provided as described hereinbefore in connection with Figures 1 and 2 of the drawings. The pole members 35 and 36 are notched or recessed, as indicated at 43 and 44, not only to receive the shading coils 41 and 42, but also to receive a magnetic bridging member 45, which is generally U-shaped, and the ends 47 and 48 of which are positioned in the recesses 43 and 44. The magnetic bridging member 45 and its ends 47 and 48 are magnetically insulated from the pole members 35 and 36 and also from the rotor 37. This is effected by providing air gaps therebetween by supporting the same on suitable mounting means (not shown).

Although, at any given instant within the limits of the phase deviation due to the presence of the shading coils 41 and 42 all of the pole member 35 has one polarity and all of pole member 36 has the opposite polarity, because of the presence of the ends 47 and 48 of the magnetic bridging member 45 between the ends of the pole members 35 and 36, six effective poles are provided in the stator in place of two as before. The polar relationship at a given instant is indicated by the letters N and S in Figure 3 of the drawings.

When the magnetic bridging member 45 is employed in the shaded pole type of motor 32, as shown in Figure 3 of the drawings, the rotor 37 operates at a speed of 1200 R. P. M. rather than at a speed of 3600 R. P. M. as before when the magnetic bridging member 45 is not used.

In Figures 5, 6, and 7 of the drawings still another embodiment of my invention is illustrated. The reference character 50 designates, generally, a motor construction which is particularly adapted for mechanisms requiring a relatively slow speed such as 400 R. P. M. The motor 50 is provided with a magnetic core structure comprising end members 51 and 52 which have extensions 53 and 54 that project toward each other, as is more clearly shown in Figure 6 of the drawings. Plate-like magnetic members 55 serve to bridge the gap between the juxtaposed ends of the extensions 53 and 54. The extensions 53 and 54 and the plates 55 form a magnetic connecting member between the end members 51 and 52 and there is mounted thereon a winding 56 which is adapted to be connected to a suitable source 57 of alternating current, such as a 60-cycle source. The end members 51 and 52 have pole members 59 and 60 which are generally arcuate in shape which are located on diametrically opposite sides of a rotor 61 in the form of a wheel having a rim 62 and three spokes 63. The rotor 61 is formed of suitable magnetic material such as hardened steel. The spokes 63 are joined in a hub 64 that is mounted on a shaft 65, Figure 6, which is mounted for rotation in a suitable bearing 66. The bearing 66 is mounted on a support plate 67 of suitable non-magnetic material such as brass.

In order to make the rotor 61 self-starting on energization of the winding 53 from the single phase source 57 of alternating current, arcuate polar extensions 69 and 70 are provided from each of the pole members 59 and 60, respectively. Between the ends of the polar extensions 69 and 70 and the adjacent pole members 59 and 60, there are provided relatively high reluctance air gaps 71 and 72, which, if desired, can be bridged by magnetic shunting members 73 and 74, respectively. The motor construction shown in Figures 5, 6, and 7 and described thus far is generally similar to one of the embodiments of motor construction shown in my Patent 2,187,180.

With a view to arranging the core structure shown in Figures 5, 6, and 7 so that it will provide eighteen effective poles, the polar extensions 69 and 70 are recessed as indicated at 75 and 76. It will be observed that four recesses 75 are provided in the polar extension 69 and that a similar number of recesses 76 is provided in the polar extension 70. Inturned ends 77 and 78 of a spider formed of magnetic material and having arms 79 and 80 are located in the recesses 75 and

76, the four inturned ends 77 being located in the recesses 75 and the other four inturned ends 78 being located in the recesses 76.

The arrangement of the spider comprising the arms 79 and 80 with the inturned ends 77 and 78 together with the pole members 59 and 60 and the polar extensions 69 and 70 provides eighteen effective poles in the stator so that the rotor 61 tends to operate at a speed of 400 R. P. M. when the winding 56 is connected to a source 57 that operates at a frequency of 60 cycles per second. The poles are indicated by the letters N and S at a given instant. When the rim 62 of the rotor 61 is formed of hardened steel, permanent poles are induced therein which reacting with the poles of the stator cause the rotor 61 to operate at synchronous speed, in this case at a speed of 400 R. P. M.

Since certain further changes can be made in the foregoing constructions and different embodiments of the invention can be made without departing from the scope thereof, it is intended that all matter shown in the accompanying drawings and described hereinbefore shall be considered as illustrative and not in a limiting sense.

I claim as my invention:

1. An electric motor comprising, in combination, a rotor, a magnetic core structure having a pair of pole members on diametrically opposite sides of said rotor with an air gap between each pole member and the rotor, winding means on said core structure adapted to be connected to a source of alternating current, and magnetic bridge means stationarily mounted between said pole members so as to span said rotor and interconnect diametrically opposite points of said air gaps and arranged to have flux induced therein by said pole members to provide poles having polarities opposite to the polarities of the inducing pole members so as to increase the number of effective poles provided by said core structure over the number provided by said pole members alone.

2. An electric motor comprising, in combinatin, a rotor, a magnetic core structure having a pair of pole members on diametrically opposite sides of said rotor with an air gap between each pole member and the rotor, winding means on said core structure adapted to be connected to a source of alternating current, and a magnetic bridge member stationarily positioned between said pole members so as to span said rotor and interconnect diametrically opposite points of said air gaps and arranged to have flux induced therein by said pole members to provide poles having polarities opposite to the polarities of the inducing pole members so as to increase the two effective poles provided by said core structure alone to at least six poles whereby for a given frequency of said alternating current source the speed of said rotor is correspondingly reduced.

3. An electric motor comprising, in combination, a rotor, a magnetic core structure having a pair of arcuate pole members on diametrically opposite sides of and uniformly spaced from said rotor with an air gap between each pole member and the rotor, winding means on said core structure adapted to be connected to a source of alternating current, and magnetic bridge means stationarily mounted between said pole members and spanning said rotor and conforming generally to the arcuate shape thereof and inter-connecting diametrically opposite points in said air gaps and arranged to have flux induced therein by said pole members to provide poles having polarities opposite to the polarities of the inducing pole members so as to increase the number of effective poles provided by said core structure over the number provided by said arcuate pole members alone.

4. An electric motor comprising, in combination, a rotor, a magnetic core structure having a pair of arcuate pole members on diametrically opposite sides of and uniformly spaced from said rotor with an air gap between each pole member and the rotor, winding means on said core structure adapted to be connected to a source of alternating current, and a generally U-shaped magnetic bridge member stationarily positioned so as to span said rotor and conforming generally to the arcuate shape thereof and interconnecting diametrically opposite points in said air gaps and arranged to have flux induced therein by said pole members to provide poles having polarities opposite to the polarities of the inducing pole members so as to increase the two effective poles provided by said core structure alone to at least six poles whereby for a given frequency of said alternating current source the speed of said rotor is correspondingly reduced.

5. An electric motor comprising, in combination, a rotor, a magnetic core structure having a pair of pole members on diametrically opposite sides of said rotor with an air gap between each pole member and the rotor, winding means on said core structure adapted to be connected to a source of alternating current, only one arcuate polar projection of magnetic material extending from each pole member toward the adjacent side of the other pole member but spaced therefrom by a high reluctance gap to render said rotor self starting, and magnetic bridge means stationarily mounted between said pole members so as to span said rotor and interconnect diametrically opposite points of the air gaps between said pole members and said rotor and arranged to have flux induced therein by said pole members to provide poles having polarities opposite to the polarities of the inducing pole members so as to increase the number of effective poles provided by said core structure alone.

6. An electric motor comprising, in combination, a rotor, a magnetic core structure having a pair of arcuate pole members on diametrically opposite sides of and uniformly spaced from said rotor with an air gap between each pole member and the rotor, winding means on said core structure adapted to be connected to a source of alternating current, only one arcuate polar projection of magnetic material extending from each pole member toward the adjacent side of the other pole member but spaced therefrom by a high reluctance gap to render said rotor self starting, and a generally U-shaped magnetic bridge member stationarily positioned so as to span said rotor and conforming generally to the arcuate shape thereof and interconnecting diametrically opposite points in the air gaps between said pole members and said rotor and arranged to have flux induced therein by said pole members to provide poles having polarities opposite to the polarities of the inducing pole members so as to increase the two effective poles provided by said core structure alone to at least six poles whereby for a given frequency of said alternating current source the speed of said rotor is correspondingly reduced.

7. An electric motor comprising, in combination, a rotor, a magnetic core structure having a pair of pole members on diametrically opposite sides of said rotor with an air gap between each pole member and the rotor, winding means on said core structure adapted to be connected to a source of alternating current, shading coil means associated with each pole member to render said motor self starting, and a generally U-shaped magnetic bridge member stationarily positioned so as to span said rotor and symmetrically between said pole members and interconnecting diametrically opposite points in said air gaps and arranged to have flux induced therein by said pole members to provide poles having polarities opposite to the polarities of the inducing pole members so as to increase the two effective poles provided by said core structure alone to six poles whereby for a given frequency of said alternating current source the speed of said rotor is correspondingly reduced.

8. An electric motor comprising, in combination, a rotor, a magnetic core structure having a pair of pole members on diametrically opposite sides of said rotor with an air gap between each pole member and the rotor, winding means on said core structure adapted to be connected to a source of alternating current, only one arcuate polar projection of magnetic material extending from each pole member toward the adjacent side of the other pole member but spaced therefrom by a high reluctance gap to render said rotor self starting, and a spider formed of magnetic material spanning said rotor and interconnecting diametrically opposite points in the air gaps between said pole members and said rotor and having an even number of legs half of which cooperate with each pole member and its polar projection and arranged to have flux induced therein by said pole members to provide poles having polarities opposite to the polarities of the inducing pole members so as to increase the number of effective poles provided by said core structure over the number provided by said pole members alone.

9. An electric motor comprising, in combination, a rotor, a magnetic core structure comprising a pair of pole members in cooperative relation to said rotor, said pole members having pole faces each of which has at least one recess therein intermediate its ends, winding means on said core structure adapted to be connected to a source of alternating current, and a magnetic bridge member having its ends in said recesses in spaced relation to said pole members whereby on energization of said winding means the instantaneous polarities of the portions of each pole face adjacent the recess therein are the same and the end of said bridge member therein is of opposite polarity.

10. An electric motor comprising, in combination, a rotor, a magnetic core structure comprising a pair of pole members in cooperative relation to said rotor, said pole members having pole faces each of which has at least one recess therein intermediate its ends, winding means on said core structure adapted to be connected to a source of alternating current, a magnetic bridge member having its ends in said recesses in spaced relation to said pole members whereby on energization of said winding means the instantaneous polarities of the portions of each pole face adjacent the recess therein are the same and the end of said bridge member therein is of opposite polarity, and means for rendering said rotor self starting on energization of said winding means.

11. An electric motor comprising, in combination, a rotor, a magnetic core structure comprising a pair of pole members in cooperative relation to said rotor, only one arcuate polar projection of magnetic material extending from each pole member toward the adjacent side of the other pole member but spaced therefrom by a high reluctance gap to render said rotor self starting and there being at least one recess in each polar projection intermediate its ends, winding means on said core structure adapted to be connected to a source of alternating current, and a magnetic bridge member having its ends in said recesses in spaced relation to said polar projections whereby on energization of said winding means the instantaneous polarities of the portions of each polar projection adjacent the recess therein are the same and the end of said bridge member therein is of opposite polarity.

12. An electric motor comprising, in combination, a rotor, a magnetic core structure comprising a pair of pole members in cooperative relation to said rotor, said pole members having pole faces each of which has at least one recess therein intermediate its ends, winding means on said core structure adapted to be connected to a source of alternating current, a magnetic bridge member having its ends in said recesses in spaced relation to said pole members whereby on energization of said winding means the instantaneous polarities of the portions of each pole face adjacent the recess therein are the same and the end of said bridge member therein is of opposite polarity, and shading coil means surrounding portions of said pole members for rendering said rotor self starting on energization of said winding means.

13. An electric motor comprising, in combination, a rotor, a magnetic core structure comprising a pair of pole members in cooperative relation to said rotor, only one arcuate polar projection of magnetic material extending from each pole member toward the adjacent side of the other pole member but spaced therefrom by a high reluctance gap to render said rotor self starting and there being a plurality of recesses in each polar projection intermediate its ends, winding means on said core structure adapted to be connected to a source of alternating current, and a spider formed of magnetic material having a plurality of legs the end portions of which are located in corresponding recesses in said polar projections in spaced relation thereto whereby on energization of said winding means the instantaneous polarities of the portions of each polar projection adjacent the recesses therein are the same and the ends of the spider therein are of opposite polarity.

14. An electric motor comprising, in combination, a rotor, a magnetic core structure comprising a plurality of main pole members in cooperative relation to said rotor with an air gap between each pole member and the rotor, winding means on said core structure adapted to be connected to a source of alternating current, and stationary magnetic bridge means spanning said rotor and providing a plurality of auxiliary pole members in said air gap energized directly and solely by induced magnetism from said main pole members and having instantaneous polarities opposite to the polarities of the inducing pole members.

EDMUND O. SCHWEITZER, Jr.